United States Patent
Bunker et al.

[11] Patent Number: 6,067,946
[45] Date of Patent: May 30, 2000

[54] DUAL-PRESSURE HYDRAULIC VALVE-ACTUATION SYSTEM

[75] Inventors: Byron J. Bunker; Amarjit S. Ghuman; Rod Radovanovic; John M. Janssen, all of Columbus, Ind.

[73] Assignee: Cummins Engine Company, Inc., Columbus, Ind.

[21] Appl. No.: 08/767,091

[22] Filed: Dec. 16, 1996

[51] Int. Cl.[7] .................................................. F16K 31/122
[52] U.S. Cl. ....................... 123/90.12; 137/1; 251/30.01; 251/63.6
[58] Field of Search ............................. 123/90.12, 90.13; 137/1; 251/30.01, 63.6

[56] References Cited

U.S. PATENT DOCUMENTS

| | | | |
|---|---|---|---|
| 4,206,728 | 6/1980 | Trenne | 123/90 |
| 4,789,131 | 12/1988 | Vork | 251/63.4 X |
| 4,930,464 | 6/1990 | Letsche | 123/90.12 |
| 5,022,358 | 6/1991 | Richeson | 123/90 |
| 5,209,453 | 5/1993 | Aota et al. | 123/90.12 X |
| 5,224,683 | 7/1993 | Richeson | 123/90.12 X |
| 5,248,123 | 9/1993 | Richeson et al. | 251/29 |
| 5,255,641 | 10/1993 | Schechter | 123/90.11 |
| 5,275,136 | 1/1994 | Schechter et al. | 123/90.12 |
| 5,367,990 | 11/1994 | Schechter | 123/90 |
| 5,373,817 | 12/1994 | Schechter et al. | 123/90.12 |
| 5,375,419 | 12/1994 | Wright et al. | 60/607 |
| 5,404,844 | 4/1995 | Schechter | 123/90.12 |
| 5,410,994 | 5/1995 | Schechter | 123/90.12 |
| 5,456,221 | 10/1995 | Schechter | 123/90.12 |
| 5,456,222 | 10/1995 | Schechter | 123/90.12 |
| 5,456,223 | 10/1995 | Miller et al. | 123/90.12 |
| 5,507,316 | 4/1996 | Meyer | 137/625.65 |
| 5,517,951 | 5/1996 | Paul et al. | 123/21 |
| 5,562,070 | 10/1996 | Schechter et al. | 123/90.12 |
| 5,595,148 | 1/1997 | Letsche et al. | 123/90.12 |

FOREIGN PATENT DOCUMENTS

| | | | |
|---|---|---|---|
| 2552492 | 3/1985 | France | 123/90.12 |
| 59-188016 | 10/1984 | Japan . | |
| 514142 | 6/1976 | U.S.S.R. | 251/63.6 |

OTHER PUBLICATIONS

International Publication No. WO93/01399, Published Jan. 21, 1993.

"An Integrated, Full Authority, Electrohydraulic Engine Valve and Diesel Fuel Injection System," J.E. Mardell and R.K. Cross, SAE Paper No. 880602 (undated).

"Camless Engine," Michael M. Schechter and Michael B. Levin, SAE Paper No. 960581 (1996).

*Primary Examiner*—Gerald A. Michalsky
*Attorney, Agent, or Firm*—Woodard, Emhardt, Naughton, Moriarty & McNett

[57] ABSTRACT

A system and a method for hydraulic actuation of poppet valves. The poppet valve is opened by application of hydraulic pressure to a piston, and is closed by action of a mechanical spring. Hydraulic pressure comes from either a high pressure source of a low pressure source, the low pressure source being higher than ambient pressure. Application of hydraulic pressure is made by a pressure control device based upon signals received from an electronic controller. Hydraulic pressure is applied in a way that minimizes the power required to actuate the valve by making use of valve inertia.

27 Claims, 12 Drawing Sheets

DUAL-PRESSURE HYDRAULIC VALVE-ACTUATION SYSTEM

BACKGROUND OF THE INVENTION

1. Field of the Invention:

The present invention relates to improvements in the field of hydraulically actuated poppet valves.

2. Description of Related Art:

Hydraulic actuation of the intake and exhaust valves of internal combustion engines offer significant improvement compared to mechanical actuation in many aspects of engine performance. Hydraulic actuation, combined with computer control, permits flexibility in valve scheduling not possible with camshafts.

Several different designs of hydraulically actuated valves have been advanced. Some designs use hydraulic pressure to both open and close the valves. The poppet valve includes a piston integral with its valve stem. High-pressure hydraulic fluid applied to one side of this piston opens the valve. High pressure hydraulic fluid on the other side of the piston creates a force in the direction of closing the valve. The valve is opened by an application of high-pressure fluid during the initial portion of the opening stroke to obtain a high opening velocity, followed by reliance on the valve's inertia to complete the opening. The valve is held open by hydraulic lockup of fluid on one side of the piston. Release of this lockup of fluid a low-pressure reservoir permits high-pressure fluid on the closing side of the piston to accelerate the valve toward the closed position. When the valve closing velocity is suitably high, fluid on top of the piston is momentarily locked again. As the valve slows, some of its inertia is traded for creation of high-pressure hydraulic fluid, which is returned to the high-pressure reservoir. Release of the lockup permits the poppet valve to complete the closing cycle. This class of hydraulically actuated valves requires a precisely machined piston integral with the valve stem. Also, the engine cylinder head must either be heavily modified or specially designed to accommodate the piston. U.S. patents incorporating this type of operation include 5,456,223 to Miller et al., and 5,255,641, 5,275,136, and 5,456,222, all to Schechter.

Another variety of hydraulically actuated valves incorporates a spring. Some designs incorporate the spring to bias the poppet valve to the closed position. At least one design incorporates a spring that biases the valve to a position intermediate of fully opened or fully closed. Some designs incorporate pistons integral with the valve stems, while others use a separate piston on top of the valve stem.

Some of these designs operate with a single source of hydraulic fluid at high pressure, maintaining the high pressure during the entire valve opening period. In some cases, the high-pressure fluid is released to an atmospheric pressure sump during valve closing. Either of these approaches can be costly to the overall performance of the engine by requiring large amounts of high-pressure hydraulic fluid. Some designs require hydraulic spool valves, a metering system, or two serial stages of valves for proper operation of the poppet valve. These additional valves increase the cost and complexity and lower the reliability of the overall valve actuation system.

Patents showing hydraulically-actuated poppet valves with return springs include U.S. Pat. No. 5,517,951 to Paul et al.; 5,022,358 and 5,248,123 to Richeson; 4,206,728 to Trenne; and Japanese Patent No. 188016 to Yamagawa et al.

To make hydraulically-controlled poppet valves commercially viable on internal combustion engines, the disadvantages of the related art must be overcome. For example, it is desirable to incorporate hydraulically-actuated poppet valves with minimal changes required to the cylinder head. Mechanical complexity and associated costs can be minimized by utilizing a spring to return the poppet valve to the closed position. It is further desirable to minimize use of high-pressure fluid during actuation of the poppet valve and to incorporate methods of recovering energy during operation of the valve. It is also desirable to use a pressure control means for applying pressure to the actuator with simple on and off states, requiring neither metering of fluid nor additional valves. No invention of the related art incorporates all these features.

The present invention provides a novel and unobvious answer to many of the problems of making hydraulically-actuated poppet valves commercially viable. Use of a valve spring for closing force reduces the cost of incorporating hydraulically-actuated poppet valves on existing cylinder heads. Control of actuation pressure is achieved with either a simple two-position valve or a simple three-position valve. Two methods of energy recovery are shown. The present invention is the first to incorporate all of these advantages.

SUMMARY OF THE INVENTION

The present invention provides for hydraulic actuation of a poppet valve, capable of moving between an open and a closed position. A spring biases the poppet valve toward the closed position. A cylinder has within it a piston able to slide within the cylinder. One side of the piston operatively engages the poppet valve, and the other side of the piston forms a first volume within the cylinder and is in fluid communication with an inlet. There are sources of high pressure fluid and low pressure fluid, the low pressure fluid being maintained at a pressure greater than ambient. A pressure control means is in fluid communication with low and high pressure sources, and can direct fluid from either of them into the inlet of the cylinder. The pressure control means is also capable of shutting off communication from the inlet of the cylinder to both sources. The pressure control means is controlled by signals from a controller. A first control signal puts the first volume of the cylinder in fluid communication with the low pressure source. A second control signal puts the first volume in fluid communication with the high pressure source. The third control signal closes fluid communication between the pressure control means and the first volume.

One objective of the present invention is to combine the full flexibility of variable valve timing in a design that can be incorporated into cylinder heads with minimal expense.

Another objective of the present invention is to permit variable valve timing in a design that reduces much of the close tolerance machining necessary with dual hydraulically-actuated systems. In the present invention, the piston of the hydraulic actuator need not be integral with the valve stem, and thus can be made simpler to manufacture.

Another advantage of the present invention is the improved control of valve peak velocity made possible by the return spring.

An objective of an alternative embodiment of the present invention is to reduce overall mechanical complexity, reduce overall electronic control complexity, and reduce the overall cost of implementation.

These and other objectives of the present invention will be apparent from the description of the preferred embodiment.

DESCRIPTION OF THE PREFERRED EMBODIMENT

Figure 1:
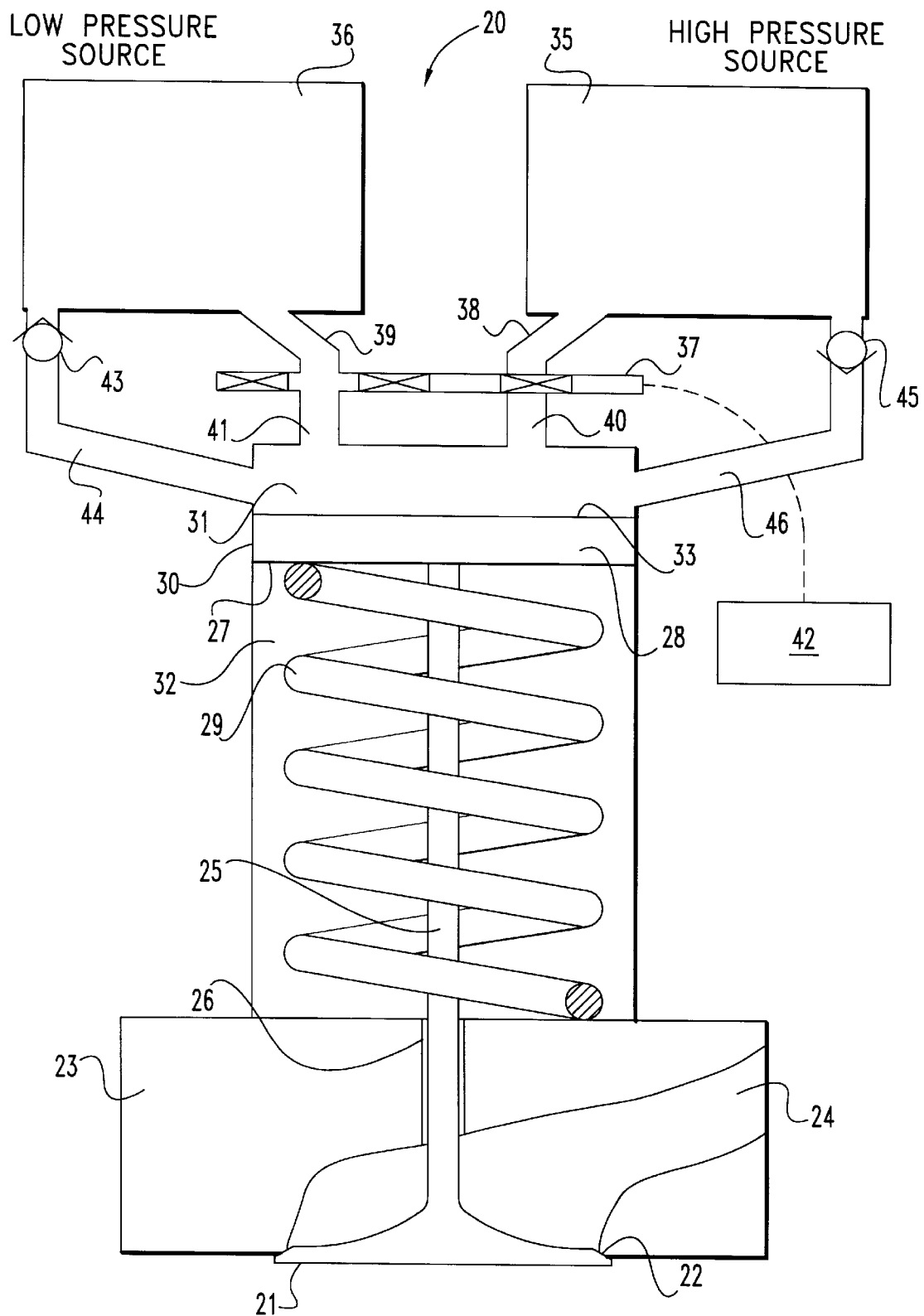
FIG. 1 is a schematic illustration of one embodiment of the present invention, showing the poppet valve static in the closed position.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

One embodiment of the present invention is shown in FIGS. 1–7. The present invention is shown applied to a poppet valve for an internal combustion engine, such as an intake valve or an exhaust valve. FIG. 1 shows poppet valve 21 of actuation system 20 in the static position resting on seat 22 of cylinder head 23, with passageway 24 closed.

Stem 25 of poppet valve 21 protrudes through guide 26 of cylinder head 23 and comes into contact with side 27 of piston 28. Although stem 25 is shown in contact with piston 28, there could be one or more additional components between piston and stem, such as a tappet or spring retainer, without departing from the objective of the present invention that a downward force acting on piston 28 be translated into a downward force that opens poppet valve 21.

Also engaging side 27 of piston 28 is return spring 29. As used in system 20, return spring 29 exerts a force in the direction of closing poppet valve 21. Downward motion of piston 28 results in downward motion of poppet valve 21 and compression of spring 29. Return of spring 29 results in upward motion of poppet valve 21 through a mutual retaining device (not shown) and also upward movement of piston 28. It is preferable to couple the spring to the poppet valve through a spring retainer, thus permitting piston 28 to be separate from the poppet valve.

The use of a return spring with a single acting hydraulic system results in less energy consumption than a double acting hydraulic system. In a double acting hydraulic system, the poppet valve opens and maintains approximately constant acceleration for as long as high pressure hydraulic fluid is applied in the opening direction. The constant acceleration results from the constant opening force. Once high pressure is removed and the valve is permitted to continue opening under inertial forces, it then maintains approximately constant deceleration until fully opened. Peak velocity is achieved just as high pressure is removed. As the valve closes, closing acceleration is approximately constant until hydraulic lockup is activated to decelerate the valve to a fully closed position.

In the present invention, maximum velocity is achieved early in the opening stroke, and thereafter monotonically decreases. Early achievement of maximum velocity is a result of a constant pressure force being opposed by a spring force that is small when the valve is closed. As the valve continues to open, the spring force increases and valve acceleration decreases toward zero. The early achievement of maximum velocity means that there is more valve lift early in the stroke, which contributes to better airflow in passageway 24. As the valve closes, closing acceleration is highest initially since the large return force of the spring is opposed by a constant pressure force. This high closing acceleration permits the valve to remain open for a longer period of crankshaft rotation, and still achieve full closing at the proper time.

Energy consumption of a single acting hydraulic system with a return spring is lower than a comparable double acting system, because peak valve velocity in the single acting system is approximately 20% lower than for a double acting system. Thus total work to open the single acting valve with return spring is approximately 38% lower than for a dual acting system.

The single acting system is even more advantageous if a non linear spring is used. Such a spring should have a low spring rate when the poppet valve is closed, and a high spring rate when open. With such a spring, peak velocity can be further reduced resulting in even less energy consumption. With a Cummins 4 valve "C" series engine, an initial spring rate (valve closed) of approximately 250 lb/in (43.8 kN/m) and a final spring rate (valve fully opened) of approximately 4000 lb/in (700 kN/m) provide good results. The lower limit for the initial spring rate should result in a natural frequency for the valve assembly in excess of 400 rad/sec. The final spring rate is defined by the minimum value of high pressure multiplied by the area of piston 28 divided by the peak desired valve lift.

Figure 15:
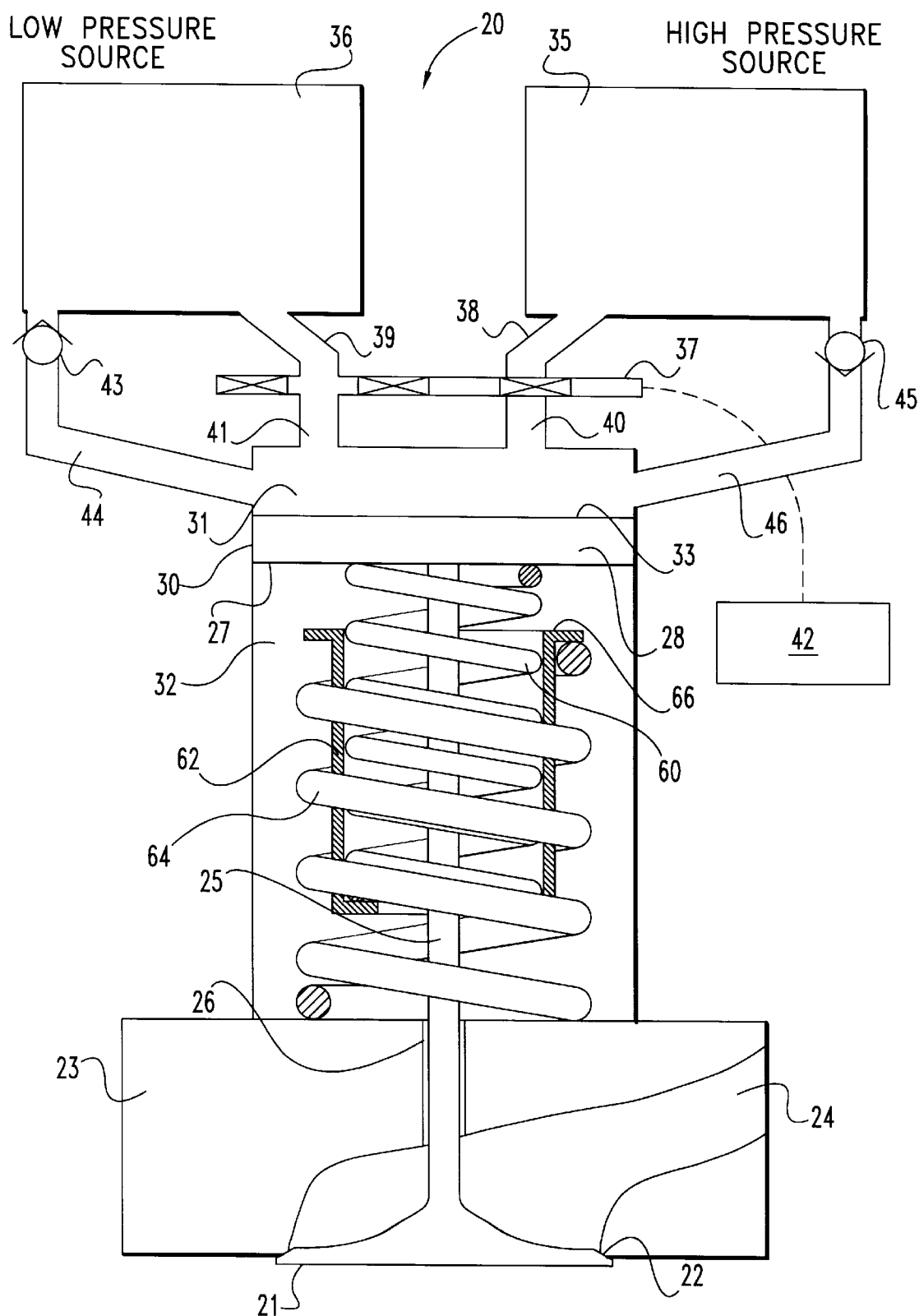
FIG. 15 is a schematic illustration showing the invention of FIG. 1, with the poppet valve static in the closed position, and including a first arrangement of dual springs.

It is also possible to achieve nonlinearities in overall spring characteristics by using two springs. FIG. 15 shows a first arrangement in which spring 29 has been replaced by an assembly of inner spring 60, spring retainer 62, and outer spring 64. Spring retainer 62 is shown in cross-section. It is preferable to use retainer 62 or another retainer to couple valve 21 to the biasing springs. This coupling is not depicted.

Downward motion of piston 28 causes side 27 to push against stem 25 of poppet valve 21. Since valve 21 is coupled to inner spring 60 by a retainer (not shown), this downward motion results in compression of inner spring 60. Inner spring 60 pushes against spring retainer 62, and retainer 62 pushes against outer spring 64. After piston 28 has moved sufficiently, side 27 comes into contact with surface 66 of retainer 62. Once contact is established, further movement of piston 28 in the direction of valve opening works directly to compress only outer spring 64. Inner spring 60 remains at a fixed height within retainer 62. In this arrangement, the effective total spring constant of the assembly is that of springs 60 and 64 in series until contact of side 27 and surface 66 is achieved, and is that of spring 64 only after contact is achieved. Note that if an additional retainer (not shown) is used to couple the spring to the valve then this additional retainer will contact surface 66, rather than side 27. It is preferred but not necessary that spring 60 have a lower spring rate than that of spring 64. It is also possible to rearrange the spring assembly of FIG. 17 such that the inner, smaller diameter spring is in contact with cylinder head 23 and the outer, larger diameter spring is in contact with piston 28. In such an arrangement, the cross-sectional shape of spring retainer 62 would be inverted to that shown in FIG. 17.

Figure 16:
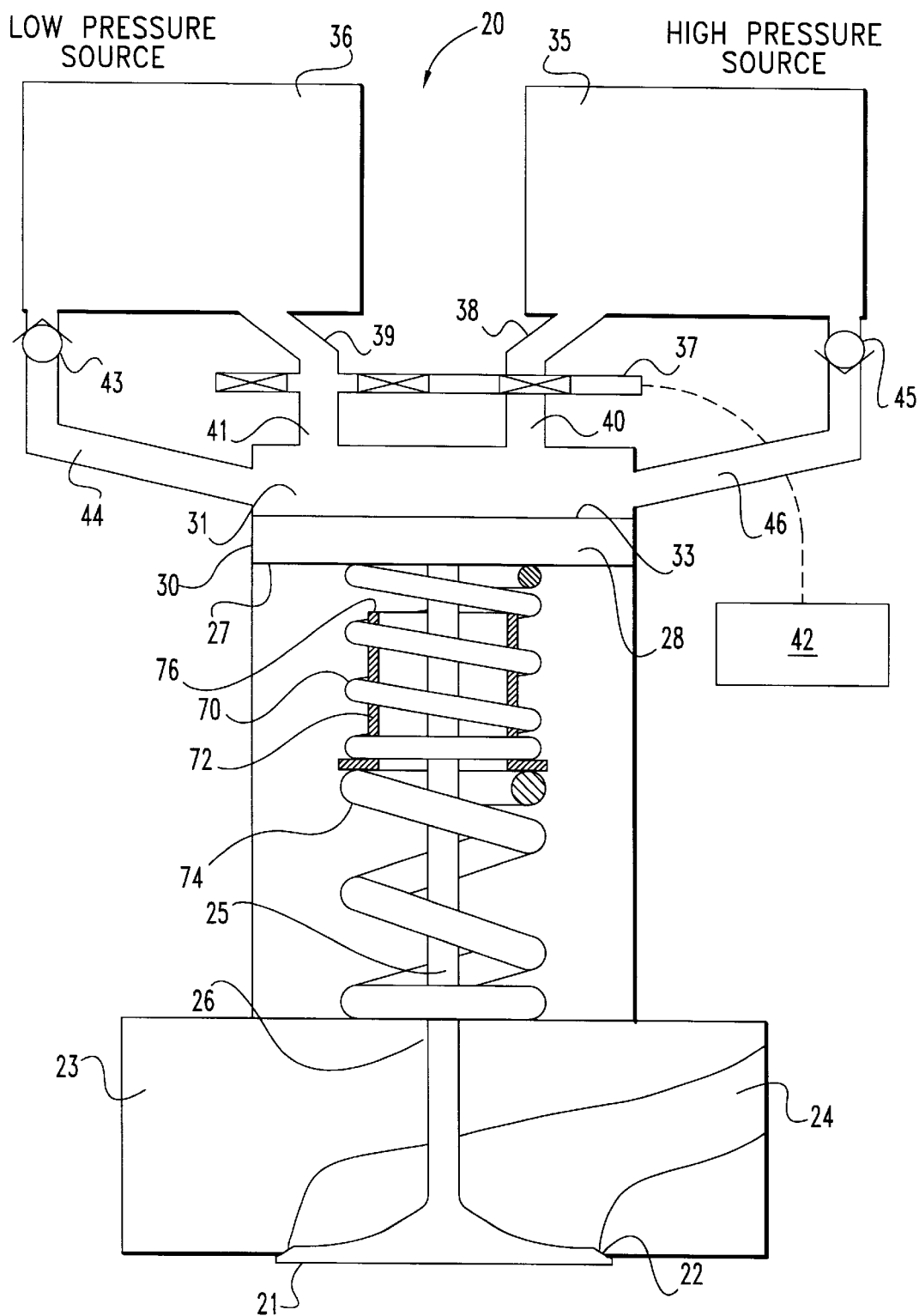
FIG. 16 is a schematic illustration showing the invention of FIG. 1, with the poppet valve static in the closed position, and showing a second arrangement of dual springs.

FIG. 16 shows a second alternative arrangement of a dual-spring assembly. Spring 29 has been replaced by an assembly of first spring 70, spring retainer 72, and second spring 74. Spring retainer 72 is shown in cross section. It is preferable to use retainer 72 or another retainer to couple valve 21 to the biasing springs. This coupling is not depicted.

Downward motion of piston 28 causes side 27 to push against stem 25 of poppet valve 21. Since valve 21 is coupled to first spring 70 by a retainer (not shown), this downward motion results in compression of both first spring 70 and second spring 74, since the springs are arranged in series. Continued movement of poppet valve 21 toward the opened position results in side 27 of piston 28 contacting surface 76 of retainer 72, although if an additional retainer (not shown) is used to couple the spring to the valve then this additional retainer will contact surface 76. Once contact is achieved, further opening motion acts to compress only second spring 74. In the preferred embodiment, first spring 70 has a lower spring rate than second spring 74. It is also possible for this assembly to function with first spring 70 having a higher spring constant than second spring 74. Although dual-spring assemblies are shown only in FIGS. 15 and 16, either of the two arrangements are applicable to the embodiments of the present invention illustrated in FIGS. 1–7 and FIGS. 8–14. These dual spring arrangements may also be combined with the features shown in FIGS. 17 and 18.

Referring again to FIG. 1, piston 28 is slidably engaged in cylinder 30. Piston 28 divides cylinder 30 into two volumes, and seals each volume from fluid communication with the other. First volume 31, defined in part by side 33 of piston 28, contains fluid under pressure. This fluid is provided along several different connections from either high pressure source 35 or low pressure source 36. Second volume 32, defined in part by side 27 of piston 28, is near atmospheric pressure.

High pressure source 35 provides fluid at a pressure in the range of 500–3000 psig in the present invention. The high pressure fluid can be generated by any of several different types of pumps, including gear and piston types, which can be powered in several different ways, including mechanical drive from the engine or electric motor. Low pressure fluid can be generated by its own pump, or it could be drawn from the high pressure system. High pressure source 35 and low pressure source 36 may also include their own collection of auxiliary devices, such as pressure regulators, filters, and accumulators. In addition, it is also possible that either or both of these sources could be pressurized from sources of fluid already incorporated on the engine. For example, an engine oil pump, a transmission fluid pump, or a fuel pump could be used to pressurize either of the sources, or they could be used as a boost to the inlet of separate pumps for either source. Low pressure source 36 is at approximately 50 psig in the present invention, with a preferable range of 25 to 100 psig. The low pressure must be great enough to maintain sufficient supply of fluid into first volume 31 to prevent cavitation when poppet valve 21 is opening without first volume 31 being supplied by high pressure source 35.

The preferred manner of generating both the high pressure and low pressure sources includes a single variable displacement pump driven mechanically by the engine. This pump provides high pressure fluid to high pressure source 35. High pressure source 35 has a regulating control that maintains pressure within a desired range, spilling any excess fluid to a low pressure source 36. A second regulating device maintains low pressure source 36 at the desired pressure range, spilling excess fluid back to a sump. This sump is also the source of fluid for the variable displacement pump.

Pressurized fluid is provided to first volume 31 of cylinder 30 along several different fluid communication paths. Pressure control means 37 provides two such paths for fluid entry. In the embodiment of the invention in FIGS. 1–7, pressure control means 37 is schematically depicted as a three-position, three-way electrohydraulic valve. Pressure control means 37 has inlet 38 in fluid communication with high pressure source 35, and inlet 39 in fluid communication with low pressure source 36. The outlet of pressure control means 37 is in fluid communication with first volume 31. For ease of understanding, pressure control means 37 is shown in fluid communication with cylinder inlet 40 for providing high pressure fluid and cylinder inlet 41 for providing low pressure fluid. These two inlets may be replaced with a single inlet connection to first volume 31 without departing from the present invention.

Pressure control means 37 has three positions. Reception of the first control signal places pressure control means 37 in the first position, and establishes fluid communication from low pressure source 36 to first volume 31. Reception of the second control signal places pressure control means 37 in the second position, and establishes fluid communication from high pressure source 35 to first volume 31. Reception of the third control signal places pressure control means 37 in the third position, and closes off inlets 40 and 41 from fluid communication with either source.

The position of pressure control means 37 is commanded by controller 42. Controller 42 is responsible for when poppet valve 21 opens, the manner in which it opens, the length of time for which it is held open, the timing at which poppet valve 21 is closed, the manner in which it is closed, and the length of time for which it is held closed, as well as other functions. The controller many be analog or digital in nature and has an interface suitable for applying control signals to the pressure control means. As poppet valve actuation system 20 is applied to an internal combustion engine, controller 42 is also provided sufficient sensory information from the engine so that it can apply the control signals synchronously with the crankshaft.

Figure 17:
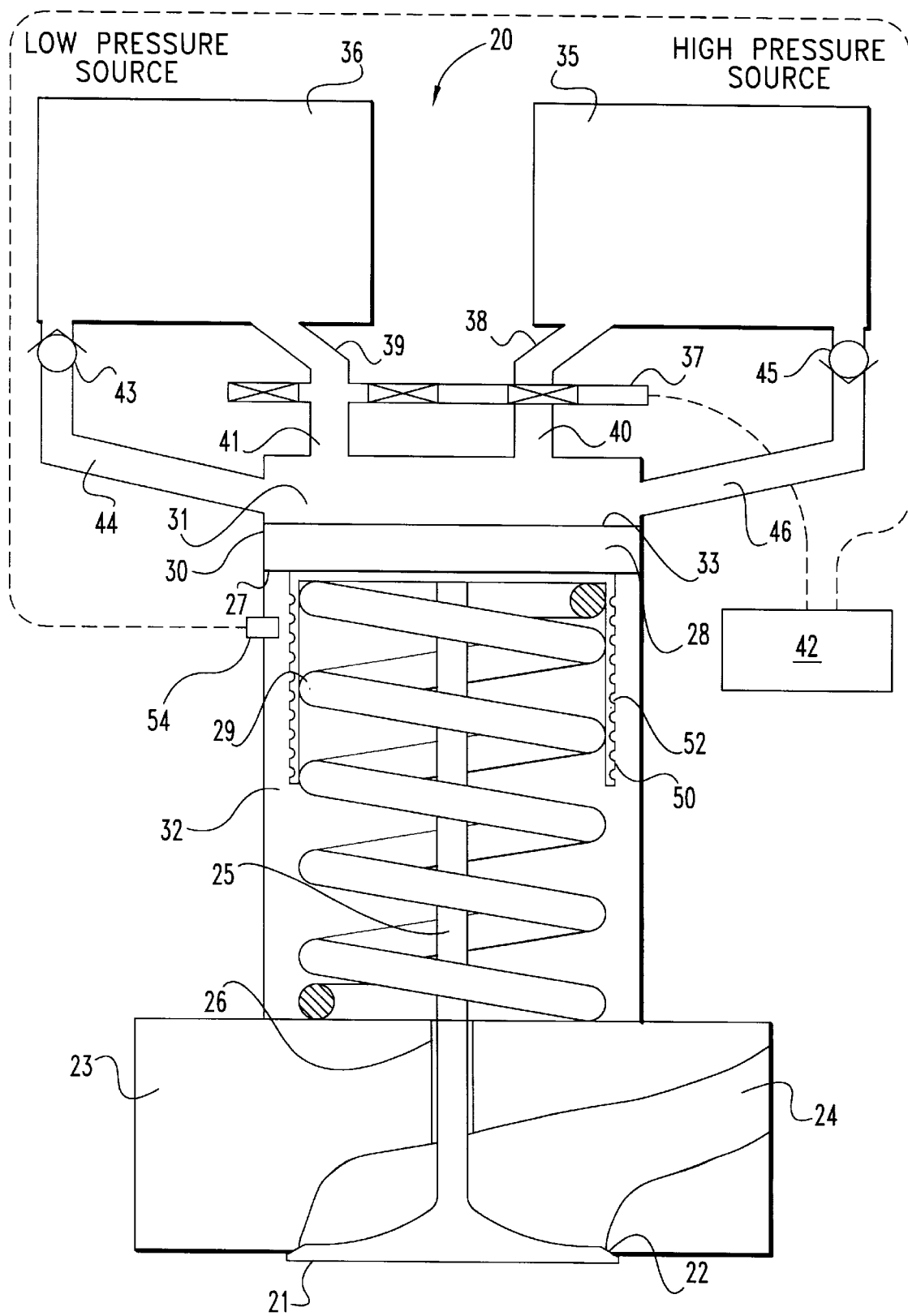
FIG. 17 is a schematic illustration showing the invention of FIG. 1, with the poppet valve static in the closed position, and including features for measurement of poppet valve position.

FIG. 17 shows a sensor that would provide information about valve position to controller 42. Spring retainer 50 is shown around spring 29, and in between spring 29 and surface 27 of piston 28. As piston 28 moves, surface 52 of retainer 50 moves past Hall effect sensor 54. Sensor 54 is attached to cylinder 30. Surface 52 has indices cut into it which permit controller 42 to interpret the signal of sensor 54 to a position of valve 21. Although a Hall effect sensor has been described and shown, there are other types of sensors that could be used, including a variable reluctance sensor. The number and location of valve position sensors can vary. For example, it would be possible to place a single sensor on one exhaust valve. Another arrangement would have valve position sensors on one intake valve and one exhaust valve. Yet another arrangement would have valve position sensors on all intake valves and all exhaust valves. Although a sensor is shown only in FIG. 17, a sensor could be incorporated in any of the embodiments and alternatives described in this specification.

In FIG. 1, pressure control means 37 is shown commanded to the first position. The first volume 31 is pressurized from low pressure source 36. Fluid communication from first volume 31 to high pressure source 35 is blocked. Low pressure fluid in cylinder 30 creates a net pressure force on piston 28 since side 27 is exposed to near ambient pressure and source 36 is always at a pressure higher than ambient. However, this net force is insufficient to overcome the force of return spring 29. Thus, there is a relationship between the pressure of low pressure source 36 and the characteristics of spring 29. The force exerted by spring 29 when poppet valve 21 is closed must be greater than the pressure force acting on piston 28.

Figure 2:
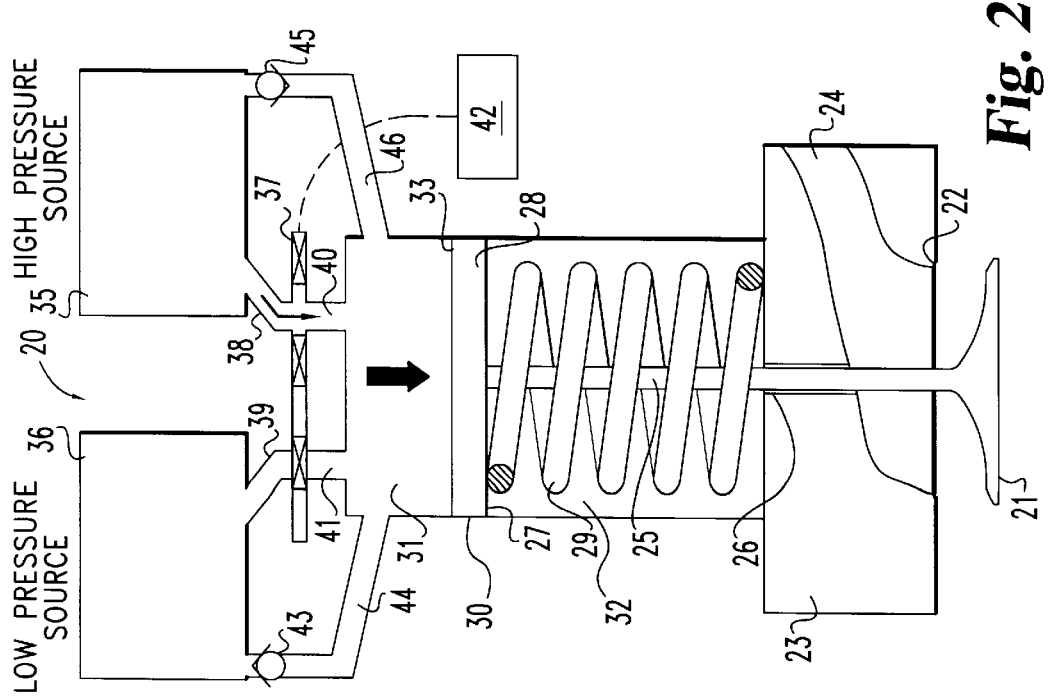
FIG. 2 is a schematic illustration showing the invention of FIG. 1, with the poppet valve accelerating toward the fully open position.

FIG. 2 shows pressure control means 37 after reception of the second control signal from controller 42. This second control signal causes pressure control means 37 to move to the second position, closing off fluid communication from first volume 31 and low pressure source 36 and establishing fluid communication from first volume 31 and high pressure source 35. The application of high pressure fluid creates sufficient pressure force on piston 28 to overcome the force exerted by spring 29. This net pressure force acting on piston 28 is opposed by force exerted by spring 29, friction on all surfaces with relative motion, and the inertia of all moving parts, which includes piston 28, spring 29, and poppet valve 21. Thus, there is a relationship between the pressure of high pressure source 35 and the characteristics of spring 29.

The spring force of spring 29 that opposes the pressure force of piston 28 includes a static preload imposed on spring 29 during installation into its position. As poppet valve 21 continues to open, spring force increases from its preload as determined by the spring constant. Thus, a low preload on spring 29 results in higher initial acceleration of all moving parts. Also, a lower spring rate results in the moving parts maintaining a higher acceleration level as poppet valve 21 opens.

Figure 3:
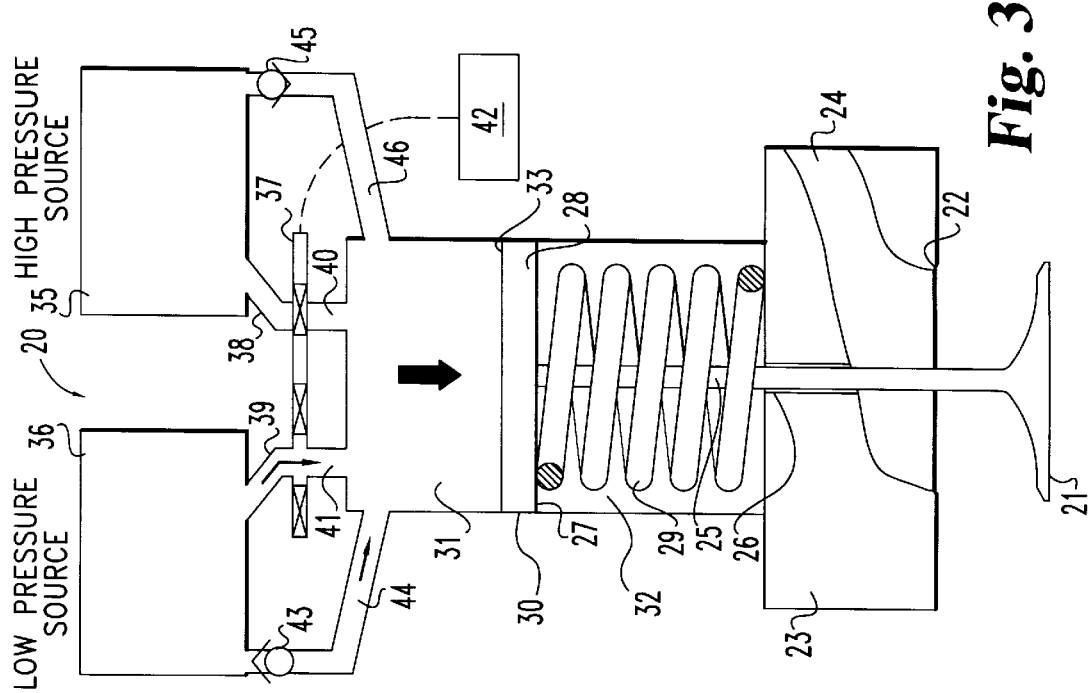
FIG. 3 is a schematic illustration showing the invention of FIG. 1 decelerating to the fully open position.

The application of the second control signal to pressure control means 37 imparts significant acceleration to the moving masses. In so doing, poppet valve 21 quickly opens and enhances flow through passageway 24. However, the second control signal is applied on pressure control means 37 for only a portion of the opening stroke of poppet valve 21. After poppet valve 21 has opened sufficiently far and gained sufficient opening velocity, the first control signal is again applied by controller 42 to pressure control means 37 as shown in FIG. 3. Fluid flow into first volume 31 from source 35 is prevented, and from source 36 is reestablished. Poppet valve 21 continues to open, the combined inertia of all moving parts being sufficient to overcome force exerted by spring 29 and friction and other losses.

As side 33 of piston 28 moves downward, first volume 31 increases and fluid from source 36 is drawn in through inlet 41. Low pressure fluid can also enter first volume 31 through low pressure check valve 43. Outlet 44 of this check valve is in fluid communication with first volume 31. If the supply of fluid through inlet 41 is insufficient, then a slight pressure differential is imposed on check valve 43 causing it to open and provide additional fluid to first volume 31. The supply of fluid through check valve 43 helps avoid cavitation within pressure control means 37 or first volume 31.

As poppet valve 21 approaches the fully opened position, a third control signal is applied by controller 42 to pressure control means 37. This third signal cuts off supply of fluid through inlets 40 and 41. Poppet valve 21 continues to open under inertial forces. As it does so, low pressure fluid is still provided through check valve 43.

Figure 4:
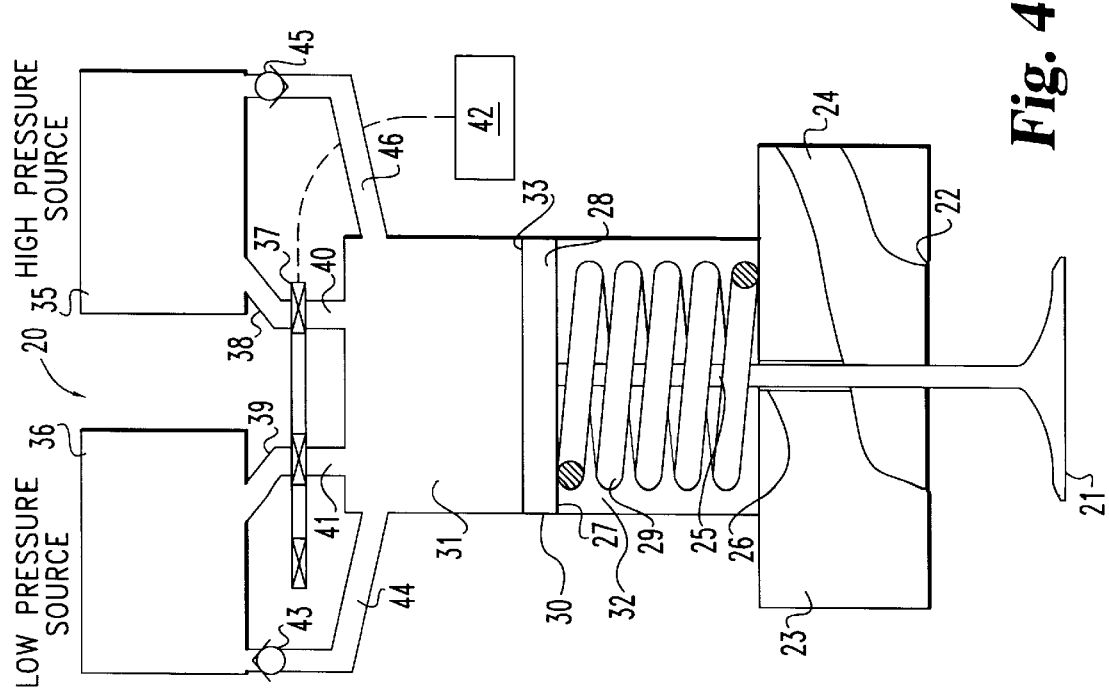
FIG. 4 is a schematic illustration showing the invention of FIG. 1 with the poppet valve static in the fully opened position.

Once inertial forces are no longer sufficient to continue opening poppet valve 21, force exerted by return spring 29 attempts to close the poppet valve. Refer to FIG. 4. However, this spring force results in only negligible closing movement, since fluid within first volume 31 is trapped and incompressible. There is a high pressure check valve 45 in fluid communication with first volume 31 and high pressure source 35. Spring force is also insufficient to open valve 45. Thus, poppet valve 32 is hydraulically locked in the open position.

Figure 5:
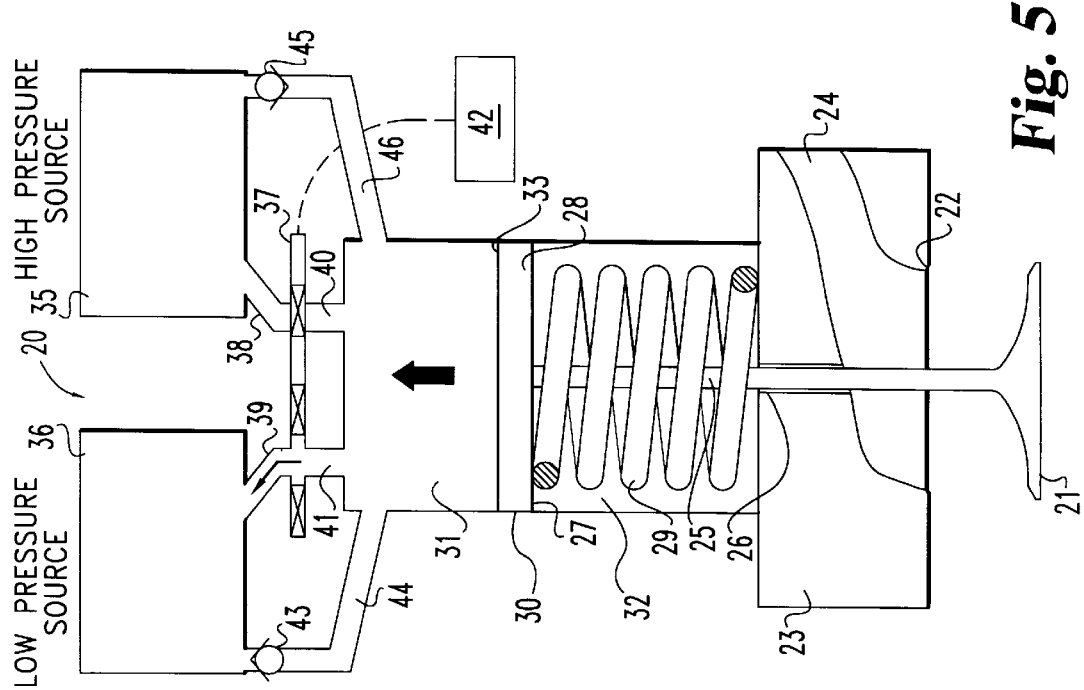
FIG. 5 is a schematic illustration showing the invention of FIG. 1 with the poppet valve accelerating toward the closed position.

After controller 42 is satisfied that poppet valve 21 has dwelled in the open position for a sufficient period of time, it applies the first control signal to pressure control means 37. Refer to FIG. 5. This establishes a path of fluid communication from first volume 31 to low pressure source 36. This reduces pressure within first volume 31, and since the pressure of source 36 is insufficient opposition to the force exerted by spring 29, the moving parts accelerate toward the closed position. The degree of acceleration is related to the net force acting in the closed direction divided by the total moving mass. This net force can be increased by having a high spring force in the fully opened position. A high spring force results in high closing acceleration, which permits a longer open dwell period for the poppet valve to improve the function of the engine.

Figure 6:
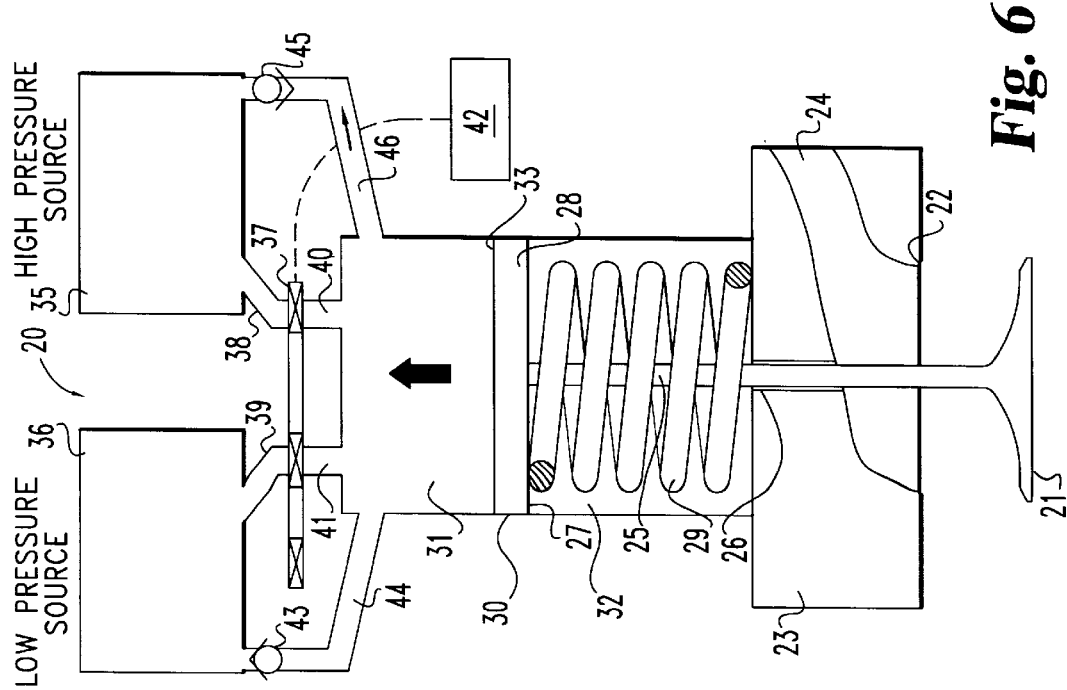
FIG. 6 is a schematic illustration showing the invention of FIG. 1 with the poppet valve decelerating toward the closed position.

As poppet valve 21 continues to move toward the closed position, with fluid flowing into source 36 and the velocity of poppet valve 21 increasing in the closed direction, controller 42 applies the third control signal. Refer to FIG. 6. Pathways out of the first volume 31 through either of inlets 41 or 40 are closed. Also, low pressure check valve 43 does not permit flow out of first volume 31. However, a combination of forces resulting from spring 29 and inertia from moving parts creates sufficient pressure within cylinder 30 to unseat high pressure check valve 45 and permit flow of fluid into source 35 through outlet 46. High pressure check valve 45 is in fluid communication with first volume 31 and high pressure source 35. This check valve is oriented to permit flow into high pressure source 35. However, fluid flows through this check valve only if the pressure within first volume 31 is greater than the pressure of source 35, such that check valve 45 becomes unseated.

Thus, some of the stored energy of spring 29 and the kinetic energy of the moving masses are converted into high pressure fluid which can be returned to source 35. This minimizes the pump work necessary to generate source 35. At the same time, the poppet valve is decelerated to prevent high impact loads between poppet valve 21 and seat 22. The amount of fluid returned to source 35 depends upon both the spring force and inertial force.

Figure 7:
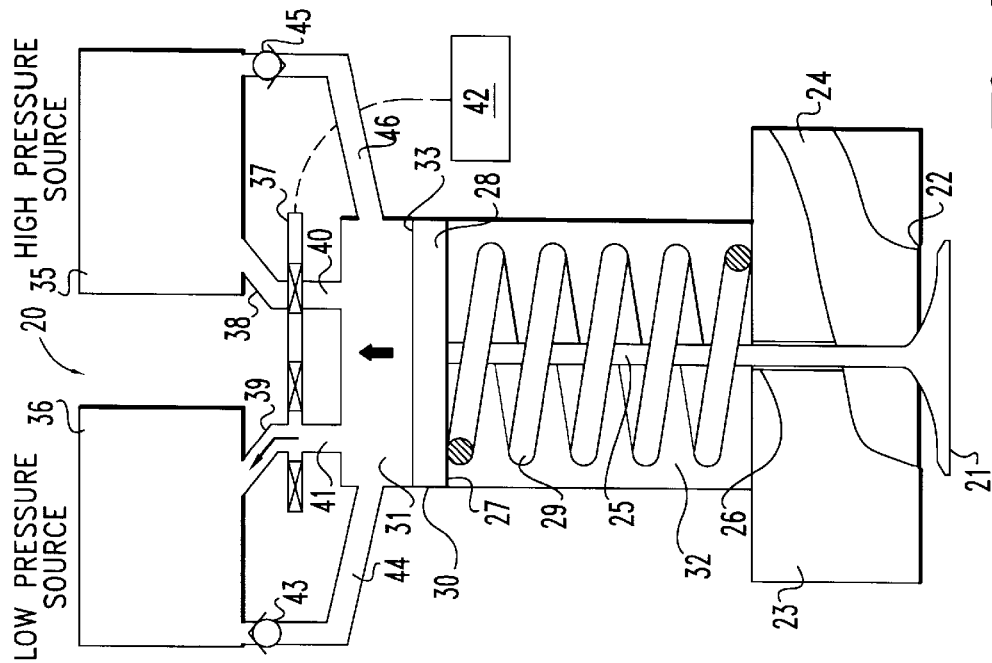
FIG. 7 is a schematic illustration showing the invention of FIG. 1 immediately prior to seating of the poppet valve in the fully closed position.

After poppet valve 21 has sufficiently decelerated, the first control signal is again applied to pressure control means 37 as shown in FIG. 7. The establishment of fluid communication from first volume 31 to source 36 permits poppet valve 21 to continue moving to the fully closed position. Spring 29 continues to exert force on piston 28 greater than the net pressure force created by source 36. Poppet valve 21 again fully seats on seat 22 of cylinder head 23.

Figure 18:
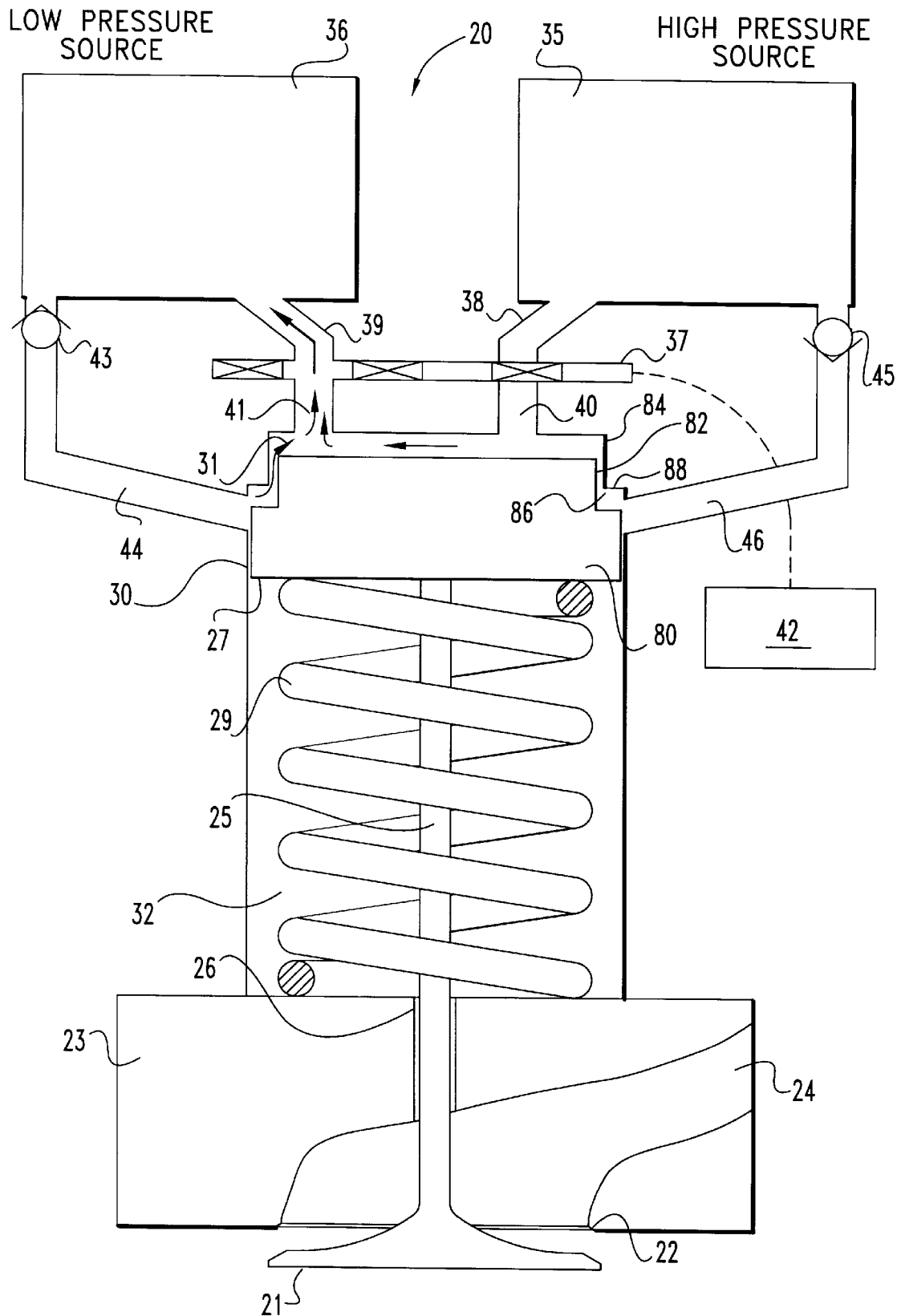
FIG. 18 is a schematic illustration showing the invention of FIG. 7 immediately prior to seating of the poppet valve in the fully closed position, and including a hydraulic snubber.

FIG. 18 illustrates the use of a snubber to assist in decelerating poppet valve 21 toward the fully closed position. In FIG. 18, the piston 28 shown in other embodiments and alternatives has been replaced with piston 80. Piston 80 features a smaller outer diameter 82 at the top of piston 80. As poppet valve 21 closes to within a few millimeters of its fully seated position, outer diameter 82 begins to fit within smaller inner diameter 84 of cylinder 30. Annular volume 86 is formed between piston 80 and surface 88 of cylinder 30. Continued closing of poppet valve 21 squeezes fluid within volume 86 which can only escape through the small clearance area between outer diameter 82 and inner diameter 84. Viscous drag of the fluid flowing through the small clearance area assists in slowing poppet valve 21. Although a snubbing feature is shown only in FIG. 18, this feature could also be used in any of the other embodiments and alternatives described in this specification.

Figure 8:
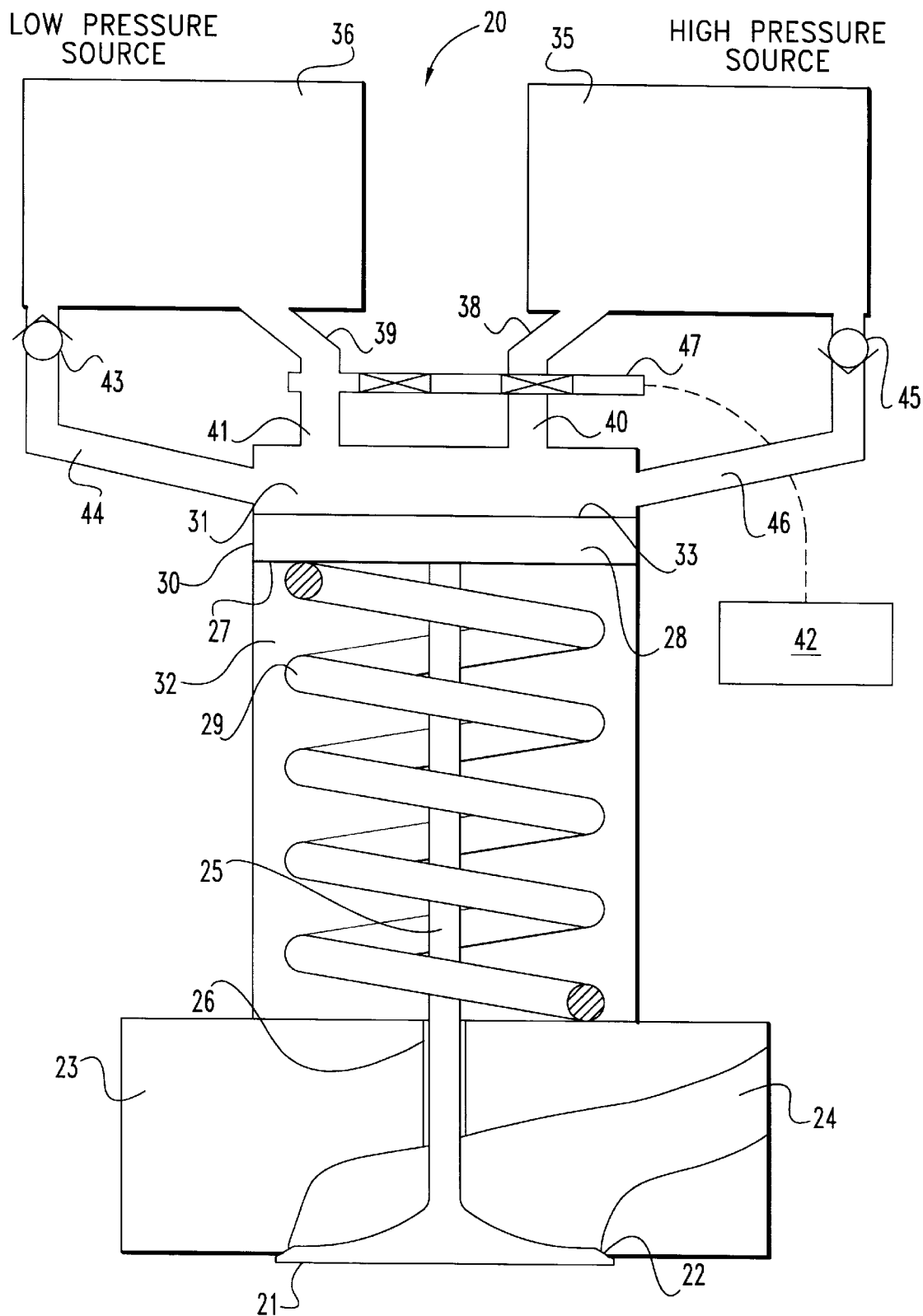
FIG. 8 is a schematic illustration of another embodiment of the present invention, showing the poppet valve static in the closed position.

FIGS. 8–14 depict an alternate embodiment of the present invention, in which the pressure control means comprises a three-way, two-position valve 47. Pressure control means 47 is shown schematically in FIG. 8. The three-way aspect of pressure control is retained, i.e., a first connection to source 36, a second connection to first volume 31, and a third connection to source 35. However, pressure control means 47 differs from pressure control means 37 by not incorporating the function of simultaneously shutting off both sources 35 and source 36. Instead, one source or the other is always in fluid communication with first volume 31. This simplification results in reduced cost for the pressure control means. For example, a single two-position solenoid valve could provide pressure control. FIG. 8 shows pressure control means 47 with the first control signal applied establishing communication from first volume 31 to source 36. As previously discussed, pressure from source 36 is insufficient to open poppet valve 21.

Figure 9:
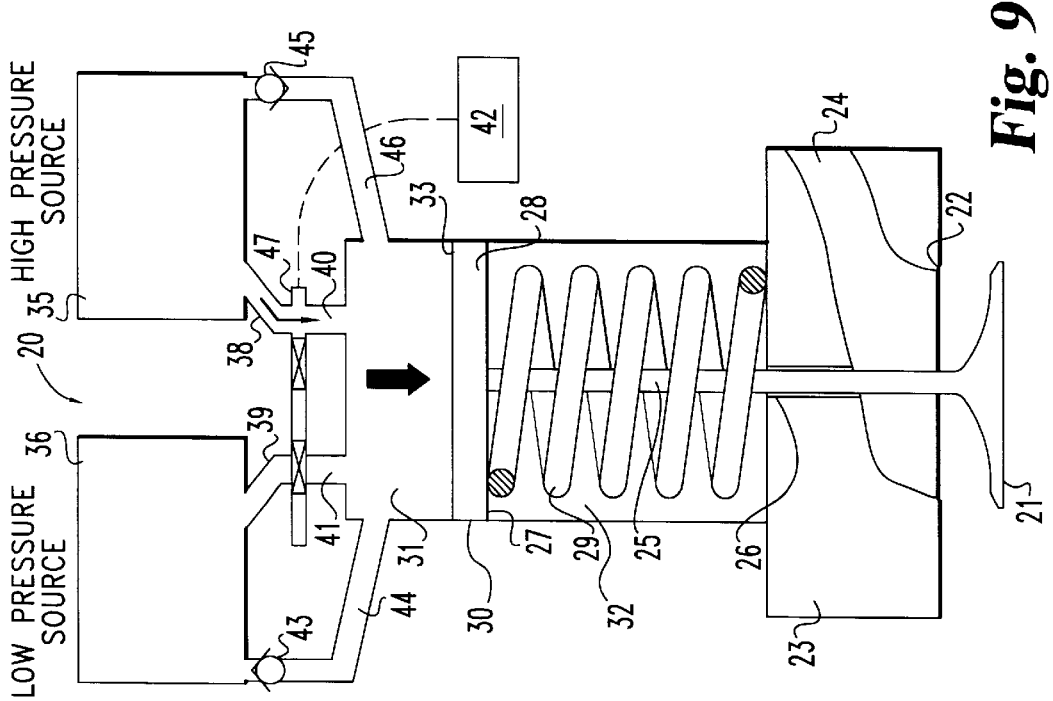
FIG. 9 is a schematic illustration showing the invention of FIG. 8, with the poppet valve accelerating toward the fully open position.

In FIG. 9, controller 42 has applied the second control signal to pressure control means 47 such that pressure from source 35 is applied to first volume 31. As previously discussed, this application of high pressure fluid is maintained for only a portion of the opening stroke of poppet valve 21.

Figure 10:
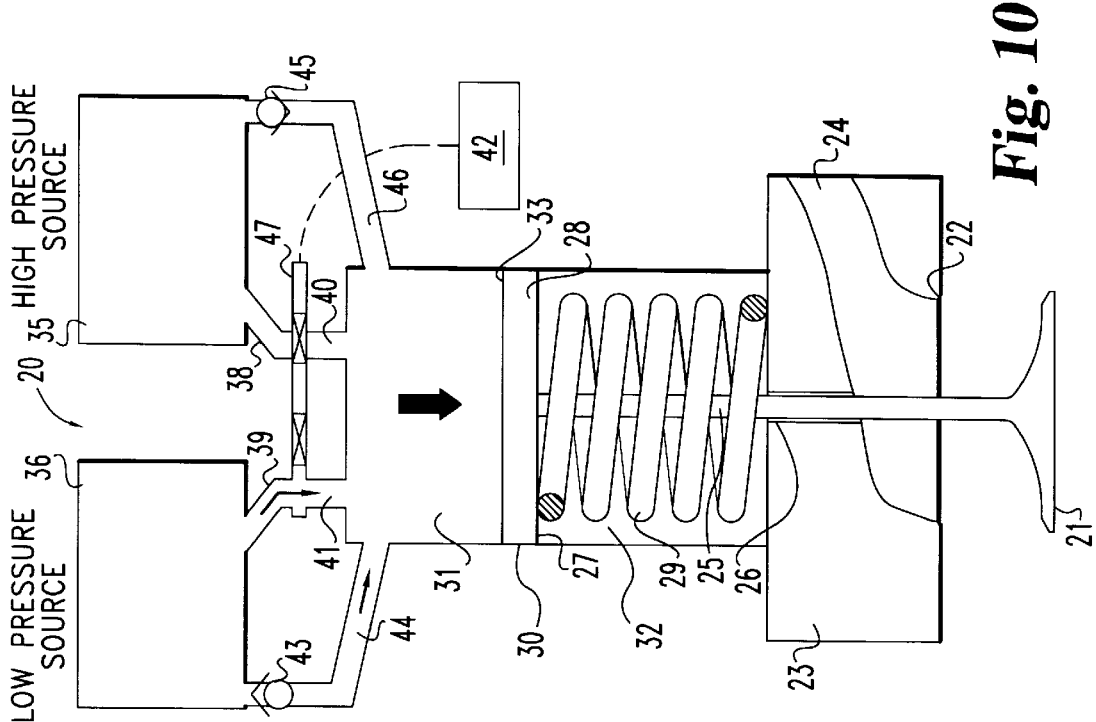
FIG. 10 is a schematic illustration showing the invention of FIG. 8 decelerating to the fully open position.

After poppet valve 21 has achieved sufficient opening velocity, controller 42 applies the first control signal as shown in FIG. 10. As previously discussed, fluid enters volume 31 through both inlet 41 and outlet 44. Poppet valve 21 decelerates toward the fully open position.

Figure 11:
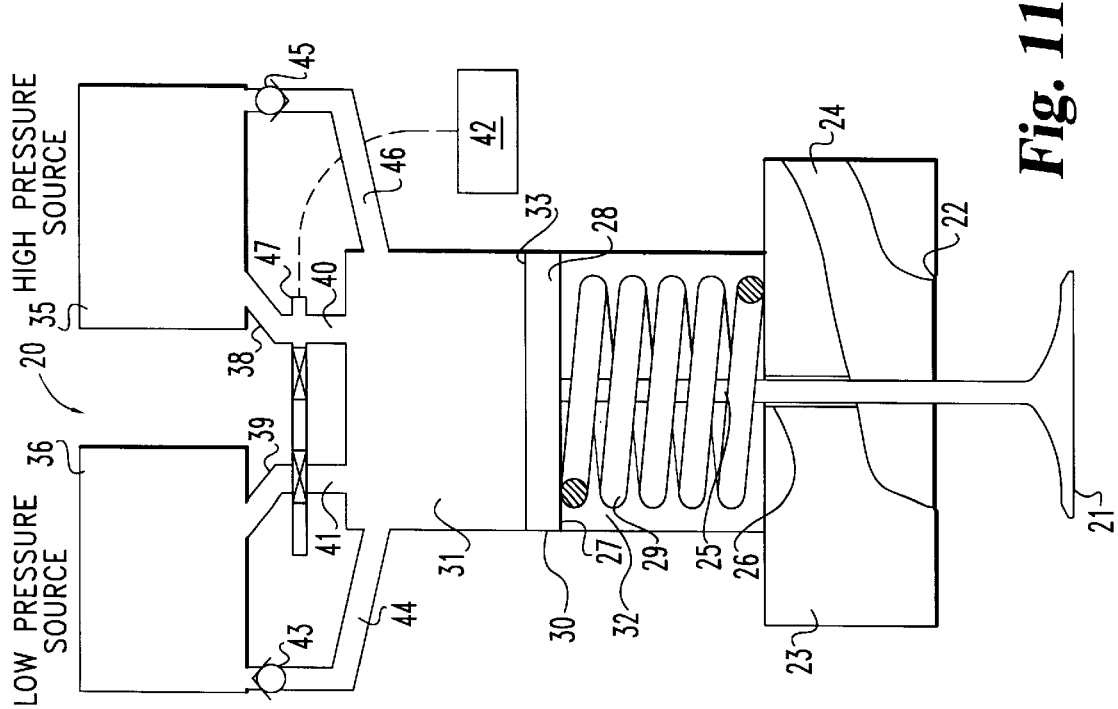
FIG. 11 is a schematic illustration showing the invention of FIG. 8 with the poppet valve static in the fully opened position.

Toward the end of the opening stroke, pressure control means 47 again receives the second control signal, putting first volume 31 in fluid communication with source 35. Refer to FIG. 11. This reapplication of high pressure fluid causes poppet valve 21 to accelerate to the fully opened position. The second control signal is maintained throughout the period for which poppet valve 21 is to be held open. This differs from the previous discussion, in which first volume 31 was maintained hydraulically locked to hold poppet valve 21 open. This second application of high pressure fluid during the opening stroke results in only a negligible increase in the power required to generate high pressure source 35 since the second application comes near the end of the opening stroke and only negligible high pressure fluid is drawn into first volume 31.

Figure 12:
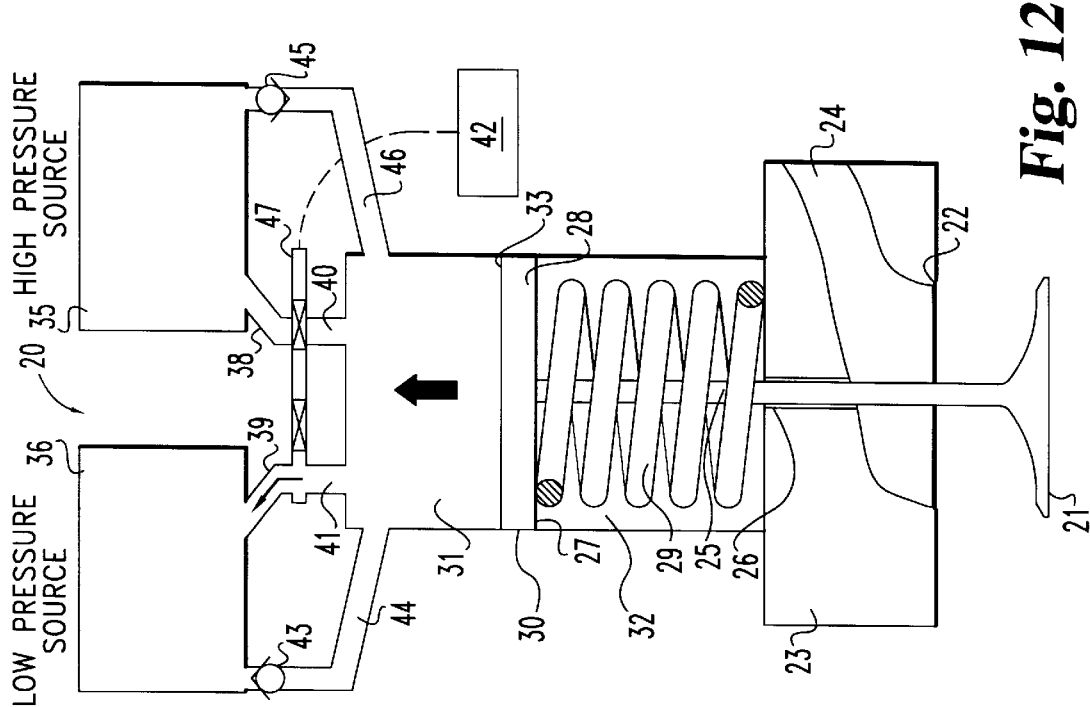
FIG. 12 is a schematic illustration showing the invention of FIG. 8 with the poppet valve accelerating toward the closed position.

FIG. 12 shows poppet valve 21 accelerating toward the closed position. Controller 42 has applied the first control signal to pressure control means 47 which puts source 36 in communication with first volume 31. Fluid flows from first volume 31 into source 36.

Figure 13:
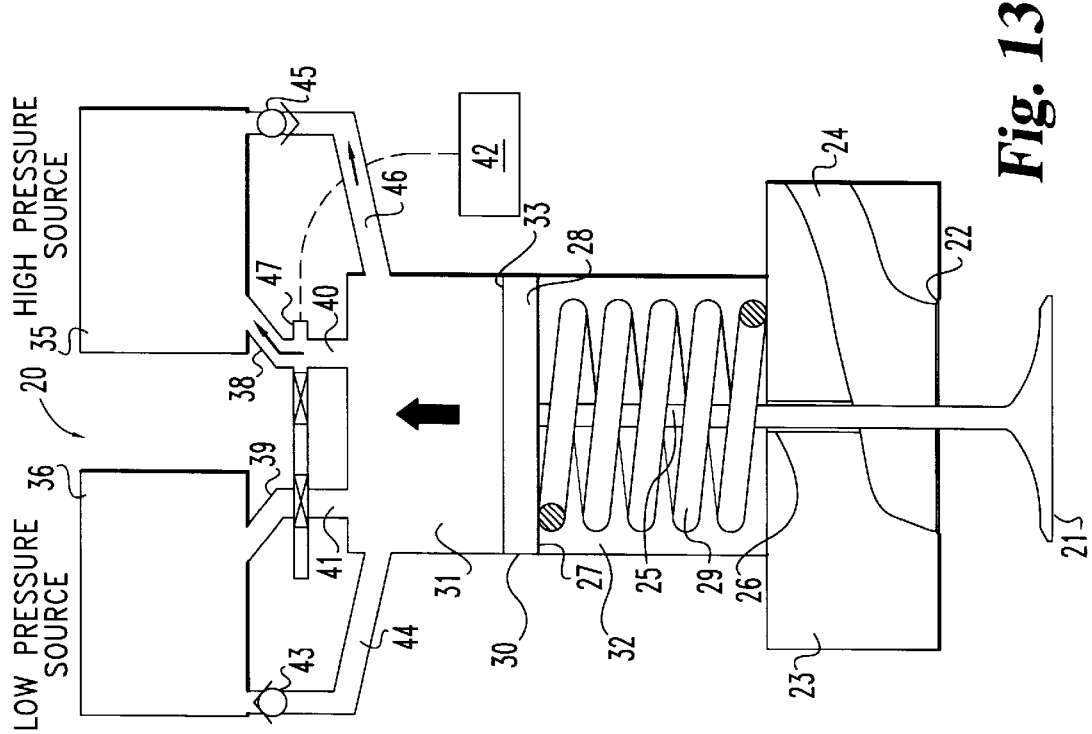
FIG. 13 is a schematic illustration showing the invention of FIG. 8 with the poppet valve decelerating toward the closed position.

As poppet valve 21 continues through the closing stroke, pressure control means 47 receives the second control signal from controller 42. Refer to FIG. 13. This places first volume 31 in fluid communication with source 35 and shuts off fluid communication to source 36. The introduction of high pressure into first volume 31 causes poppet valve 21, spring 29 and piston 28 to all begin decelerating. However, there is still sufficient inertia in those moving parts to cause some of the high pressure fluid in first volume 31 to be returned to source 35. Fluid can return either through pressure control means 47 or through high pressure check valve 45. If the flow of fluid through pressure control means 47 into source 35 creates sufficient pressure drop, then high pressure check valve 32 also opens and permits a parallel path of flow into source 35.

If the second control signal is left applied for too long a period of time, poppet valve 21 not only slows down but reverses direction and begins to open again. This differs from the embodiment of the invention described in FIG. 6. In FIG. 6, once the velocity of poppet valve 21 equals zero, poppet valve 21 remains hydraulically locked in an intermediate position.

Figure 14:
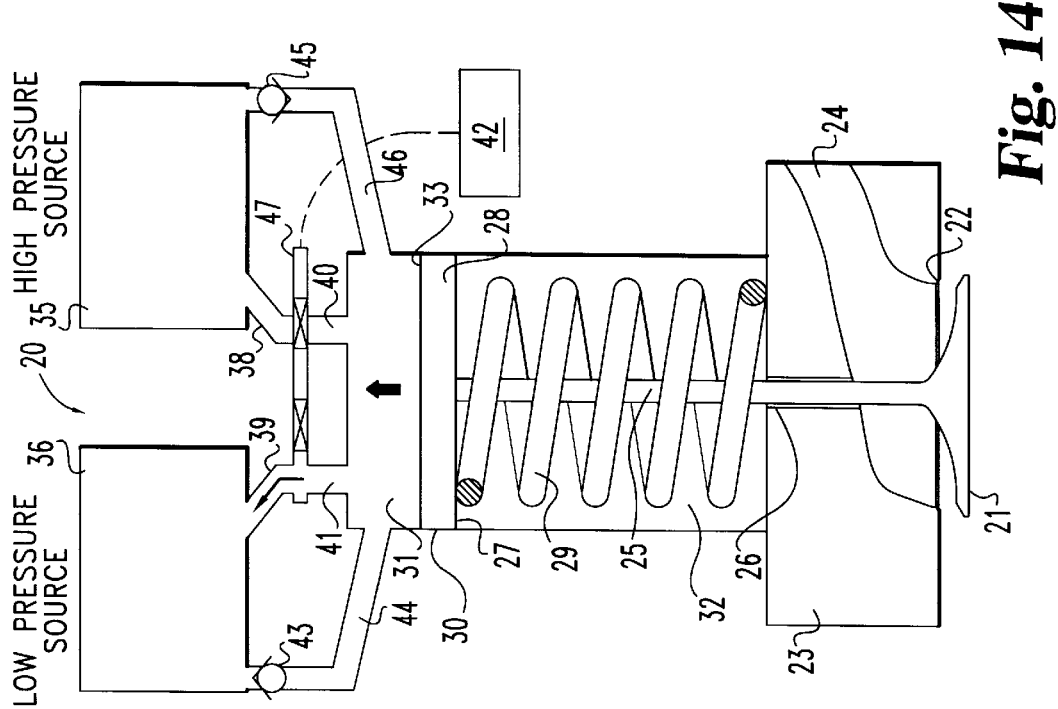
FIG. 14 is a schematic illustration showing the invention of FIG. 8 immediately prior to seating of the poppet valve in the fully closed position.

After poppet valve 21 has sufficiently decelerated and a portion of its inertia traded for creation of high pressure fluid, controller 42 applies the first control signal to pressure control means 47. Refer to FIG. 14. Since the pressure of source 36 is insufficient to overcome the force exerted by spring 29, poppet valve 21 continues to close and fully seats.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for hydraulically actuating a poppet valve between an opened position and a closed position, said method comprising the following steps:
   (a) providing fluid from a high pressure source of fluid to a cylinder, the cylinder containing a piston slidable therein, the piston operatively engaging the poppet valve;
   (b) moving of the poppet valve toward the opened position by the piston;

(c) stopping the flow of fluid from the high pressure source to the cylinder;

(d) flowing of fluid from a low pressure source of fluid into the cylinder through a first check valve, the low pressure source being at a pressure higher than ambient;

(e) holding the poppet valve in a position by preventing flow of fluid out of the cylinder;

(f) establishing fluid communication from the low pressure source of fluid to the cylinder; and (g) accelerating the poppet valve toward the closed position by a first return spring and a second return spring.

2. A system for hydraulically actuating a poppet valve between an opened position and a closed position, comprising:

a first spring constructed and arranged for biasing the poppet valve to the closed position;

a second spring constructed and arranged for biasing the poppet valve to the closed position, wherein said first spring and said second spring are arranged in series;

a cylinder having an inlet;

a piston slidably engaged in said cylinder, one side of said piston operatively engaged the poppet valve, and the opposite side of said piston forming a volume in said cylinder and being in fluid communication with the inlet;

a source of high pressure fluid;

a source of low pressure fluid, said low pressure source being at a pressure greater than ambient pressure;

a controller for applying control signals; and a means for controlling cylinder pressure in response to control signals, and having a first fluid connection to said low pressure source, a second fluid connection to the inlet, and a third fluid connection to said high pressure source, whereby application of a first control signal puts the first and second fluid connections in fluid communication, and application of a second control signal puts the second and third fluid connections in fluid communication.

3. The system of claim 2 wherein said pressure control means comprises a two-position, three-way solenoid valve.

4. The system of claim 2 which further comprises a low pressure check valve in fluid communication with said low pressure source and the inlet of said cylinder, whereby said low pressure check valve restricts flow of fluid from the inlet to said low pressure source and permits flow of fluid from said low pressure source to the inlet.

5. The system of claim 4 which further comprises a high pressure check valve in fluid communication with said high pressure source and the inlet of said cylinder, whereby said high pressure check valve restricts flow of fluid from said high pressure source to the inlet and permits flow of fluid from the inlet to said high pressure source.

6. The system of claim 2 which further comprises a high pressure check valve in fluid communication with said high pressure source and the inlet of said cylinder, whereby said pressure check valve restricts flow of fluid from said high pressure source to the inlet and permits flow of fluid from the inlet to said high pressure source.

7. The system of claim 2 wherein said controller is of the electronic digital type.

8. The system of claim 2 which further comprises a Hall effect sensor for measurement by the controller of poppet valve position.

9. A method for hydraulically actuating a poppet valve between an opened position and a closed position, said method comprising the following steps:

(a) providing fluid from a high pressure source of fluid to a cylinder, the cylinder containing a piston slidable therein, the piston operatively engaging the poppet valve;

(b) moving of the poppet valve toward the opened position by the piston;

(c) stopping the flow of fluid from the high pressure source to the cylinder;

(d) reaccelerating of the poppet valve toward the opened position by providing fluid from the high pressure source to the cylinder;

(e) holding the poppet valve in the opened position;

(f) establishing fluid communication from the low pressure source of fluid to the cylinder; and (g) accelerating the poppet valve toward the closed position by a first return spring.

10. The method of claim 9 which further comprises after said stopping step and before said reaccelerating step the step of flowing of fluid from the low pressure source into the cylinder.

11. The method of claim 10 wherein said flowing of fluid is through a first check valve.

12. The method of claim 9 wherein said accelerating of the poppet valve toward the closed position is by a first return spring and a second return spring.

13. The method of claim 9 which further comprises the steps of:

(h) instituting fluid communication from the high pressure source of fluid to the cylinder; and (i) reestablishing fluid communication from the low pressure source of fluid to the cylinder.

14. An apparatus for an internal combustion engine comprising:

a cylinder head attached to the engine, said cylinder head having a valve seat;

a hydraulically actuated poppet valve constructed and arranged for moving from a closed position to an opened position, wherein said poppet valve is in contact with said valve seat when said poppet valve is in the closed position, and said poppet valve is away from said valve seat when said poppet valve is in the opened position;

a first spring for biasing said poppet valve to the closed position, said first spring constructed and arranged for being compressed; and a second spring for biasing said poppet valve to the closed position, said second spring constructed and arranged for being compressed;

wherein said first spring and said second spring are arranged in series.

15. The apparatus of claim 14 wherein said first spring and said second spring are compressed by movement of said poppet valve when said poppet valve moves from the closed position to the opened position, and only said second spring is compressed by movement of said poppet valve when said poppet valve is proximate to the opened position.

16. The apparatus of claim 14 which further comprises a spring retainer for guiding said first spring.

17. The apparatus of claim 16 wherein said spring retainer prevents compression of said first spring during a portion of the movement of said poppet valve.

18. The apparatus of claim 17 wherein said first spring has a first spring rate and said second spring has a second spring rate, and the second spring rate is greater than the first spring rate.

19. The apparatus of claim 14 wherein a portion of said first spring fits within said second spring.

20. The apparatus of claim 19 wherein said first spring has a first spring rate and said second spring has a second spring rate, and the second spring rate is greater than the first spring rate.

21. A method for hydraulically actuating a poppet valve between an opened position and a closed position, comprising:

providing a poppet valve, a first spring, and a second spring;

moving of the poppet valve from the closed position toward the opened position;

compressing a first spring and a second spring by the movement of the poppet valve from the closed position toward the opened position;

maintaining the first spring at a fixed compressed height during a portion of the movement of the poppet valve; and compressing only the second spring during said moving and after said maintaining.

22. The method of claim 21 which further comprises providing a first spring with a first spring rate and a second spring with a second spring rate, wherein the second spring rate is greater than the first spring rate.

23. The method of claim 22 which further comprises guiding the first spring by a spring retainer.

24. The method of claim 21 which further comprises guiding the first spring within the second spring by a spring retainer.

25. The method of claim 21 wherein the first spring is within a spring retainer during said maintaining.

26. The method of claim 21 wherein said providing includes an internal combustion engine and a cylinder head for the engine with a valve seat, the poppet valve being in the closed position when the poppet valve is in contact with the valve seat, and the poppet valve being in the opened position when the poppet valve is not in contact with the valve seat.

27. A method for hydraulically actuating a poppet valve between an opened position and a closed position, said method comprising the following steps:

(a) providing fluid from a high pressure source of fluid to a cylinder, the cylinder containing a piston slidable therein, the piston operatively engaging the poppet valve;

(b) moving of the poppet valve toward the opened position by the piston;

(c) stopping the flow of fluid from the high pressure source to the cylinder.

(d) holding the poppet valve in a position by preventing flow of fluid out of the cylinder;

(e) establishing fluid communication from a low pressure source of fluid to the cylinder the low pressure source being at a pressure higher than ambient pressure; and (f) accelerating the poppet valve toward the closed position by a first return spring and a second return spring the first return spring and the second return spring being in series.

* * * * *